(12) United States Patent
Robinson

(10) Patent No.: US 10,915,185 B2
(45) Date of Patent: Feb. 9, 2021

(54) GENERATING A THREE-DIMENSIONAL IMAGE USING TILT ANGLE OF A DIGITAL PEN

(71) Applicant: HEWLETT-PACKARD DEVELOPMENT COMPANY, L.P., Houston, TX (US)

(72) Inventor: Ian N. Robinson, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 101 days.

(21) Appl. No.: 16/074,629

(22) PCT Filed: Oct. 31, 2016

(86) PCT No.: PCT/US2016/059745
§ 371 (c)(1),
(2) Date: Aug. 1, 2018

(87) PCT Pub. No.: WO2018/080543
PCT Pub. Date: May 3, 2018

(65) Prior Publication Data
US 2019/0042010 A1 Feb. 7, 2019

(51) Int. Cl.
G06F 3/0354 (2013.01)
G06F 3/041 (2006.01)
G06F 3/046 (2006.01)

(52) U.S. Cl.
CPC .......... *G06F 3/03545* (2013.01); *G06F 3/046* (2013.01); *G06F 3/0416* (2013.01)

(58) Field of Classification Search
CPC ..... G06F 3/03545; G06F 3/0416; G06F 3/046
See application file for complete search history.

(56) References Cited

U.S. PATENT DOCUMENTS

| 7,750,911 | B2 | 7/2010 | Bae |
| 7,755,623 | B2* | 7/2010 | Rockwood ............. G06T 17/30 345/419 |
| 7,880,726 | B2 | 2/2011 | Nakadaira et al. |
| 8,514,221 | B2 | 8/2013 | King et al. |
| 2007/0032720 | A1* | 2/2007 | Koivukangas ......... A61B 5/055 600/407 |
| 2009/0167702 | A1* | 7/2009 | Nurmi ................... G06F 3/0346 345/173 |
| 2015/0084936 | A1 | 3/2015 | Bae et al. |
| 2015/0123923 | A1 | 5/2015 | Stern |

(Continued)

OTHER PUBLICATIONS

Farouki et al. (Rational swept surface constructions based on differential and integral sweep curve properties, Computer Aided Design, vol. 33, Feb. 2015, pp. 1-16) (Year: 2015).*

*Primary Examiner* — Stacy Khoo
(74) *Attorney, Agent, or Firm* — Dicke Billig & Czaja PLLC

(57) ABSTRACT

A method of generating a three-dimensional (3D) image includes displaying a two-dimensional (2D) image of at least a portion of a (3D) object on a display surface. The method includes detecting a tilt angle of a digital pen while the digital pen is used to contact at least one location on a first surface of the (2D) image on the display surface, wherein the detected tilt angle represents a surface property of the first surface at the at least one location. The method includes generating a (3D) image of the object based on the detected tilt angle.

16 Claims, 9 Drawing Sheets

(56) References Cited

U.S. PATENT DOCUMENTS

2015/0212602 A1    7/2015  Lor et al.
2015/0371417 A1*  12/2015  Angelov .............. G06Q 10/101
                                                        345/442
2016/0110052 A1    4/2016  Kim et al.

* cited by examiner

GENERATING A THREE-DIMENSIONAL IMAGE USING TILT ANGLE OF A DIGITAL PEN

BACKGROUND

There is a gap or disconnect between natural two-dimensional (2D) sketching, and inputting designs into three-dimensional (3D) computer-aided design (CAD) systems. In order to create a 3D CAD image from a 2D design sketch, a designer may create elevations of their 2D design sketch (e.g. top/plan, front, side), input these into a CAD application, and then trace profile curves that can then be used to construct curved surfaces of a 3D part.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Some examples disclosed herein help to bridge the gap between natural 2D sketching and inputting designs into 3D CAD systems by enabling intuitive sketch-like input of 3D surface properties. Some examples disclosed herein allow a user to "draw" the surface information in the design sketch. Some examples disclosed herein are directed to defining the orientation and curvature of a surface of an object in a three-dimensional (3D) image by tracking the tilt angle of a digital pen when it is used to draw a straight or curved line across a corresponding surface in a two-dimensional (2D) image of the object in a sketching or CAD application. In some examples, the tilt angle at each tracked location along the line defines a surface normal at a corresponding location on a surface of the 3D image.

Figure 1:
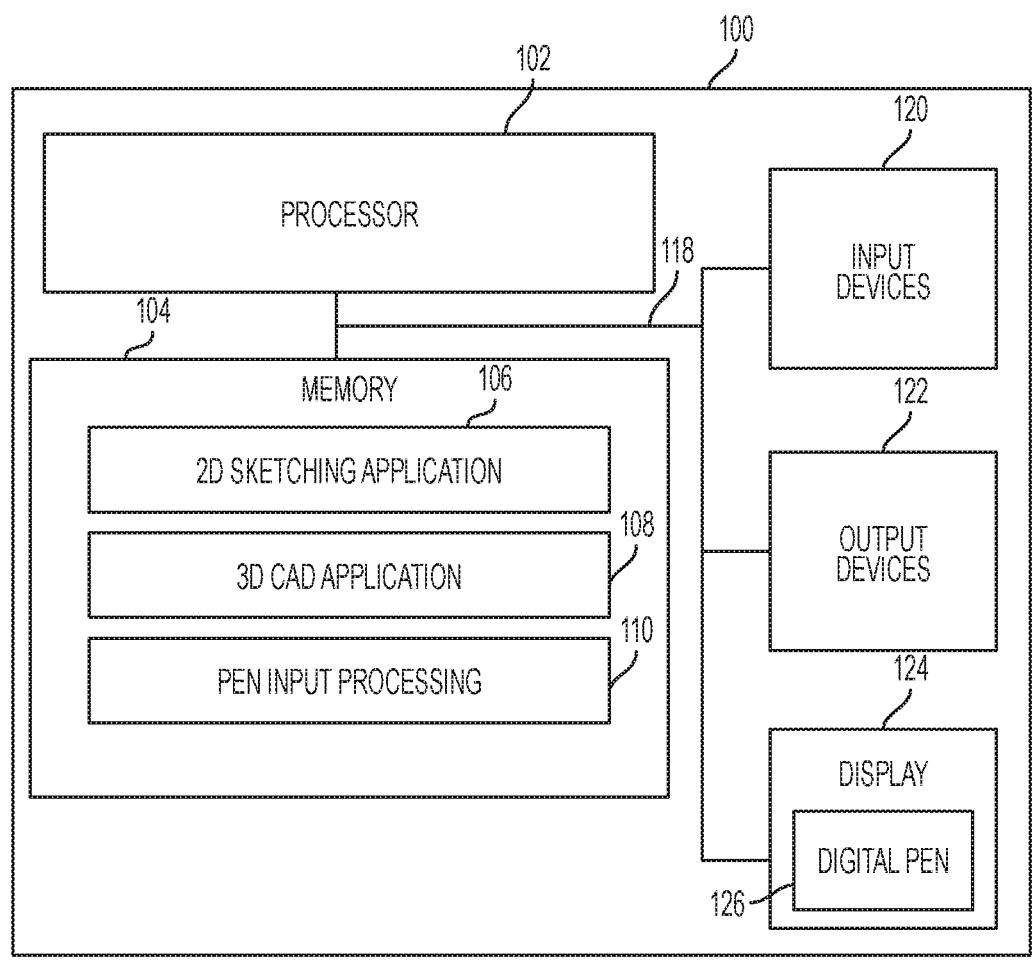
FIG. 1 is a block diagram illustrating one example of a system for generating a 3D image using the tilt of a digital pen.

FIG. 1 is a block diagram illustrating one example of a system 100 for generating a 3D image using the tilt of a digital pen. System 100 includes at least one processor 102, a memory 104, input devices 120, output devices 122, and a display 124. Processor 102, memory 104, input devices 120, output devices 122, and display 124 are communicatively coupled to each other through communication link 118. Display 124 includes an associated digital pen 126, and represents a pen-enabled interface and includes a graphical user interface for enabling pen-based interaction between a user and the display 124.

Processor 102 includes a Central Processing Unit (CPU) or another suitable processor. In one example, memory 104 stores machine readable instructions executed by processor 102 for operating system 100. Memory 104 includes any suitable combination of volatile and/or non-volatile memory, such as combinations of Random Access Memory (RAM), Read-Only Memory (ROM), flash memory, and/or other suitable memory. These are examples of non-transitory computer readable media. The memory 104 is non-transitory in the sense that it does not encompass a transitory signal but instead is made up of at least one memory component to store machine executable instructions for performing techniques described herein.

Memory 104 stores 2D sketching application 106, 3D CAD application 108, and pen input processing module 110. In some examples, the 2D sketching application 106 and the 3D CAD application 108 may be implemented together in a common application. Processor 102 executes instructions of 2D sketching application 106, 3D CAD application 108, and pen input processing module 110 to perform the techniques described herein.

Input devices 120 include a keyboard, mouse, data ports, and/or other suitable devices for inputting information into system 100. Output devices 122 include speakers, data ports, and/or other suitable devices for outputting information from system 100.

The position of the pen 126 on the display 124 may be tracked by any of a variety of technologies, including capacitive, electromagnetic (EM), ultrasound, and predetermined dot patterns. An example predetermined pattern is that provided by Anoto Group AB (Lund, Sweden). Using a predetermined element pattern such as that offered by Anoto, a detector can determine its location with respect to the pattern when placed proximate the pattern. By increasing the density of the elements (i.e., increasing the dot density by decreasing the distance between the elements, and by decreasing the size of the elements themselves) the location resolution capability of the detector is increased.

The tilt angle of the pen 126 on the display 124 may also be tracked by any of a variety of technologies, including a tilt sensor in the pen 126 or perspective distortion of a dot pattern imaged by the pen as described above. The detected pen position and pen tilt information may be provided to 2D sketching application 106, 3D CAD application 108, and/or pen input processing module 110.

In a 2D sketch of a 3D object, the normal of any portion of a visible surface varies between pointing straight at the user and +/−90 degrees, to each side of that, horizontally and vertically. The tilt of a digital pen similarly ranges from perpendicular to the plane of the drawing surface to roughly +/−90 degrees horizontally and vertically. Pen tilt may not be detectable past some angle less than 90 degrees. In this case, the measurable input tilt range may be mapped (e.g., linearly) to the +/−90 degree range of a surface normal.

Figure 2A:
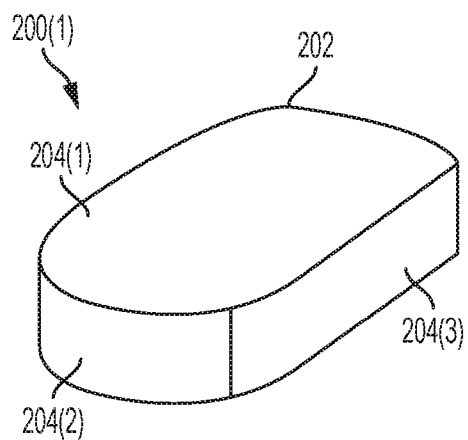
FIGS. 2A-2D are diagrams illustrating a 2D sketch of a 3D object according to one example.

FIG. 2A is a diagram illustrating a 2D sketch 200(1) of a 3D object 202 according to one example. The 2D sketch may be created, for example, using 2D sketching application 106 (FIG. 1) and displayed on display 124. The 3D object 202 includes three visible surfaces 204(1)-204(3) in the sketch 200(1). The designer of the 3D object 202 may have a good mental model of the 3D shape of the object 202, but to a typical computer drawing application, the sketch 200(1) is just a collection of lines. Thus, a designer may sketch in various profile curves to better define the orientation and curvature of the various surfaces 204(1)-204(3).

Figure 2B:
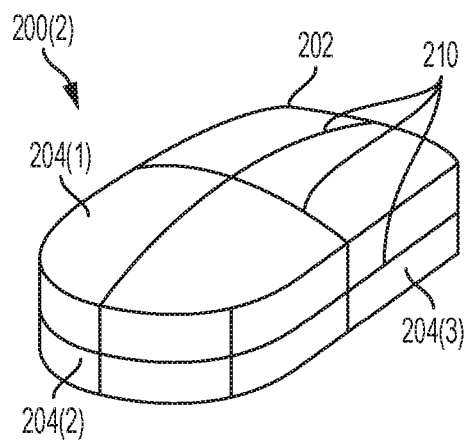

FIG. 2B is a diagram illustrating the 2D sketch shown in FIG. 2A with profile curves 210 added to the sketch according to one example. The example 2D sketch with the profile curves 210 added is identified by reference number 200(2). The profile curves 210 help to define surface properties of the surfaces 204(1)-204(3).

Figure 2C:
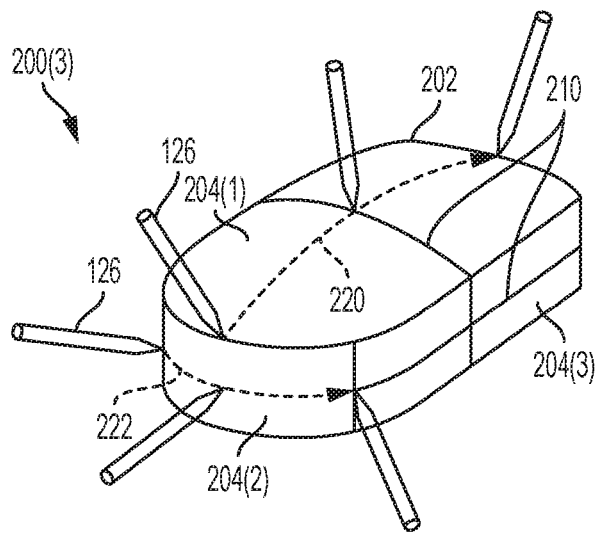

FIG. 2C is a diagram illustrating the 2D sketch shown in FIG. 2B and the use of the tilt of a digital pen 126 to define surface properties in the sketch according to one example. The example 2D sketch is identified by reference number 200(3). In FIG. 2C, digital pen 126 is shown following a path 220 over surface 204(1), and following path 222 over surface 204(2). The tilt angle of the digital pen 126 is detected and tracked while drawing over the paths 220 and 222. The user manipulates the tilt of the digital pen 126 while drawing over the paths 220 and 222 to maintain the digital pen 126 perpendicular or substantially perpendicular to the 3D surface being defined.

In some examples, the tilt angle of the digital pen 126 may be tracked while initially drawing the profile curves 210. In other examples, the tilt angle of the digital pen 126 may be tracked while a user traces over previously drawn profile curves 210. The tilt angle of the digital pen 126 may be continually tracked along the entire length of each path 220 and 222, or individual samples of the tilt angle may be detected for discrete locations. The detected tilt angle information provides unambiguous information as to the orientation and curvature of the surfaces 204(1)-204(3), which may be used by 3D CAD application 108 to develop a 3D model of the object 202.

Figure 2D:
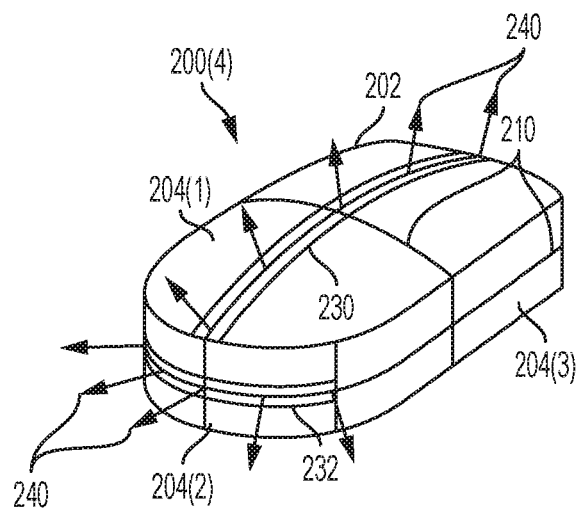

FIG. 2D is a diagram illustrating the 2D sketch shown in FIG. 2C with the addition of surface normal information according to one example. The example 2D sketch is identified by reference number 200(4). By detecting the tilt angle of the digital pen 126 along the paths 220 and 222 (FIG. 2C), the detected information provides ribbons 230 and 232 of surface normal information (represented by normal vectors 240) that can be interpolated between the drawn edges and any other drawn ribbons. If it assumed that the profile curves 210 and the associated ribbons 230 and 232 are constrained to lie in vertical or horizontal planes, then the act of drawing a continuous profile curve also helps define the 3D relationship between the drawn edges.

In some examples, the orientation of a surface, or a portion of a surface, may be manipulated by selecting it with the digital pen 126, and then tilting the pen 126 to interactively cause a corresponding change in the orientation of the surface. Some examples provide the ability to snap to specific surface orientations, which may be achieved by any of a number of methods, including keyboard shortcuts, pen button pushes, etc., as well as by increasing pressure on the pen nib.

Figure 3A:
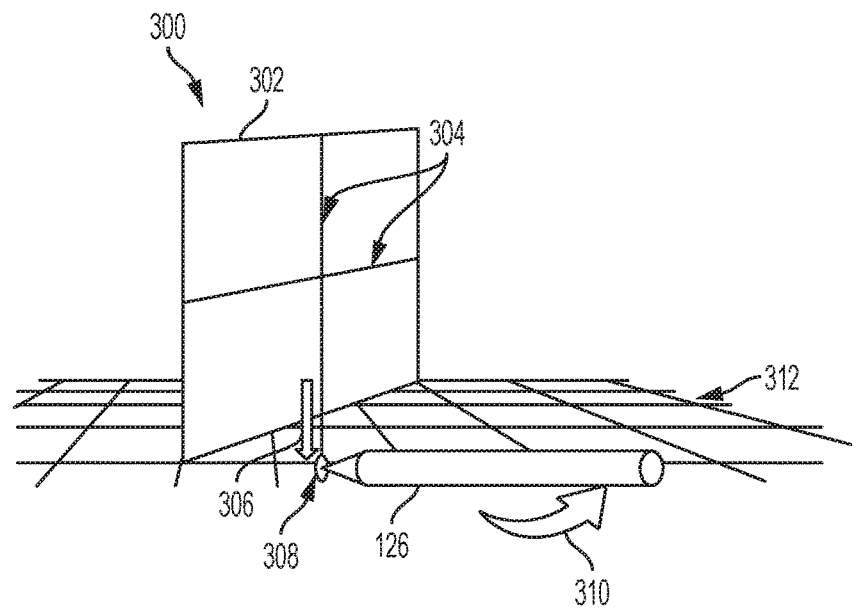
FIGS. 3A-3C are diagrams illustrating the use of pen tilt to facilitate the drawing of a 3D box according to one example.
Figure 3B:
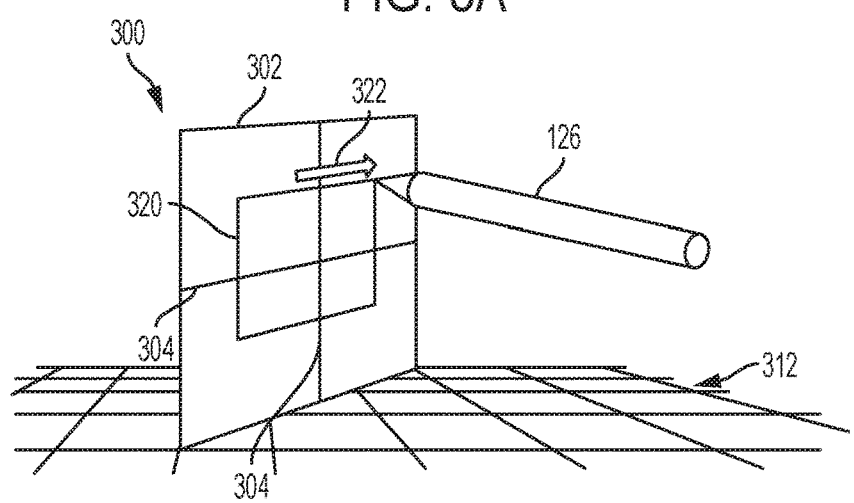
Figure 3C:
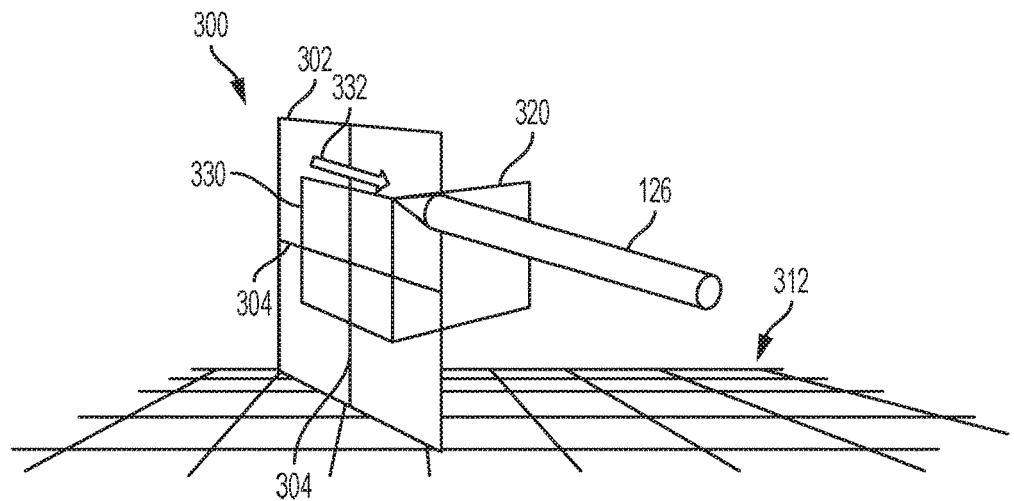

FIGS. 3A-3C are diagrams illustrating the use of pen tilt to facilitate the drawing of a 3D box according to one example. As shown in FIG. 3A, a 3D workspace 300 may be generated by 3D CAD application 108 (FIG. 1) and displayed on display 124. The 3D workspace 300 includes a grid 312 defining a horizontal plane or ground plane, and an input plane 302 for entering drawing information. The input plane 302 includes profile curves 304. The 3D workspace 300 includes a user interface element 308, which is an input plane "handle" that allows a user to manipulate the position and orientation of the input plane 302 using digital pen 126. Specifically, a user may touch the user interface element 308 with the tip of the digital pen 126 and drag the input plane 302, as represented by arrow 306, and may also change the tilt angle of the digital pen 126, as represented by arrow 310, to cause a corresponding change in the orientation of the input plane 302. In some examples, the orientation of the input plane 302 is changed to be perpendicular to a longitudinal dimension of the digital pen 126.

As shown in FIG. 3B, after a user has positioned and oriented the input plane 302 using the digital pen 126 as described above, the user draws (represented by arrow 322) a first surface 320 of the 3D box on the input plane 302 using the digital pen 126. As shown in FIG. 3C, after drawing the first surface 320, the user repositions the input plane 302 using the digital pen 126 as described above with respect to FIG. 3A. The user then draws (represented by arrow 332) a second surface 330 of the 3D box on the input plane 302 using the digital pen 126. The user may then repeat the process of repositioning the input plane 302 and drawing additional surfaces of the 3D box until the 3D drawing is complete.

Figure 4A:
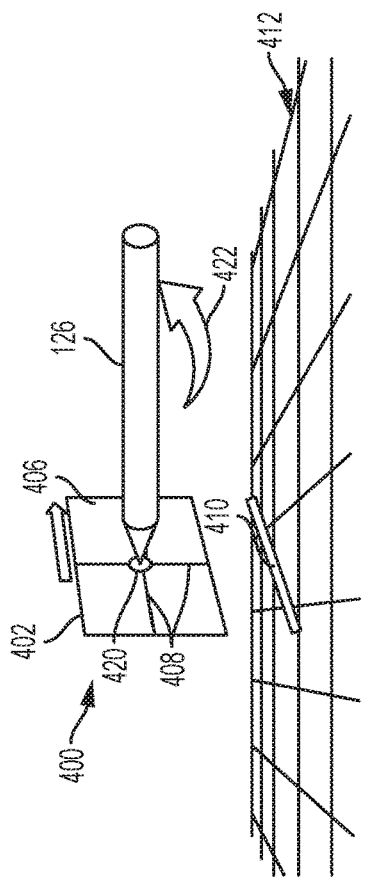
FIGS. 4A-4D are diagrams illustrating the use of pen tilt to facilitate the drawing of a 3D box according to another example.

FIGS. 4A-4D are diagrams illustrating the use of pen tilt to facilitate the drawing of a 3D box according to another example. As shown in FIG. 4A, a 3D workspace 400 may be generated by 3D CAD application 108 (FIG. 1) and displayed on display 124. The 3D workspace 400 includes a grid 412 defining a horizontal plane or ground plane. Unlike the previous example, there is no explicit input plane for entering drawing information. In one example, the input plane is a default input plane or background plane with a predetermined position and orientation. In FIG. 4A, this default input plane is face-on to the user, aligned with the back edge of the ground plane. The user may draw (represented by arrow 404) an outline 402 of a first surface 406 of the 3D box on the input plane using the digital pen 126. A drop shadow 410 may be displayed on the grid 412 in a manner corresponding to the position and orientation of the first surface 402 to indicate depth. In addition, the system may display profile curves 408 within the drawn shape 406.

Figure 4B:
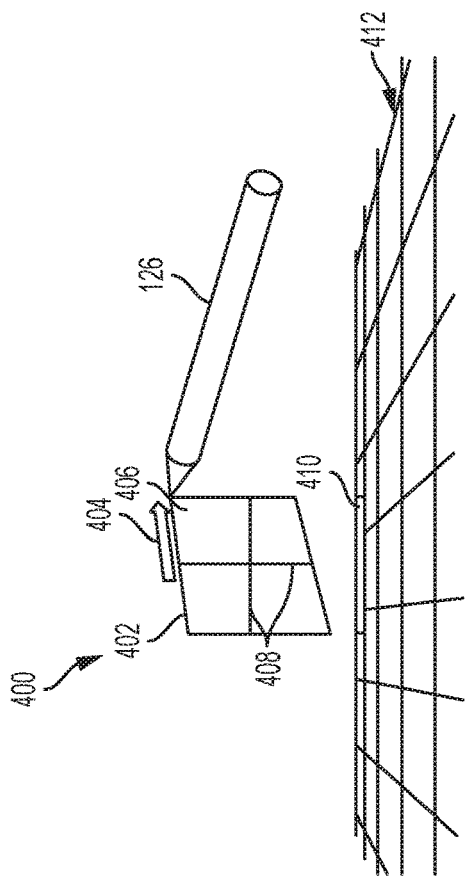

As shown in FIG. 4B, after drawing the first surface 406, the user orients the first surface 406 using the digital pen 126. Specifically, the 3D workspace 400 includes a user interface element 420 positioned near a center of the first surface 406, which allows a user to manipulate the orientation of the first surface 406 using the digital pen 126. A user may touch the user interface element 420 with the tip of the digital pen 126, and may change the tilt angle of the digital pen 126, as represented by arrow 422, to cause a corresponding change in the orientation of the first surface 406. In some examples, the orientation of the first surface 406 is changed to be perpendicular to a longitudinal dimension of the digital pen 126.

Figure 4C:
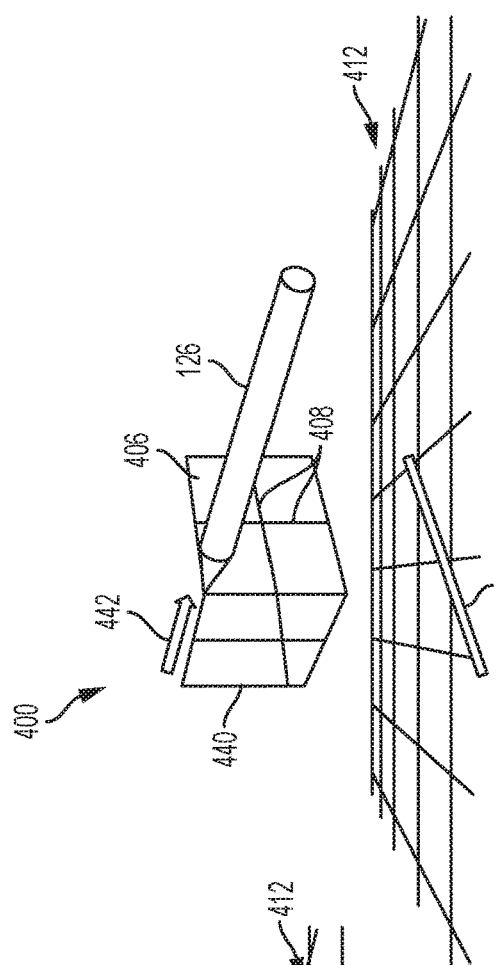

As shown in FIG. 4C, before, after, or during the orientation of the first surface 406 as described above, the user may modify the depth in the 3D workspace of the surface 406. This may be performed using the same user interface element 420 with the digital pen 126. A user may touch the user interface element 420 with the tip of the digital pen 126 and drag the user interface element 420 up or down to set the depth of the surface, as represented by arrow 432. In some examples, the changing of the position of the first surface 406 as described above does not change the visual size of the drawn shape, but the drop shadow 410 moves forward or backward based on the change in position.

Figure 4D:
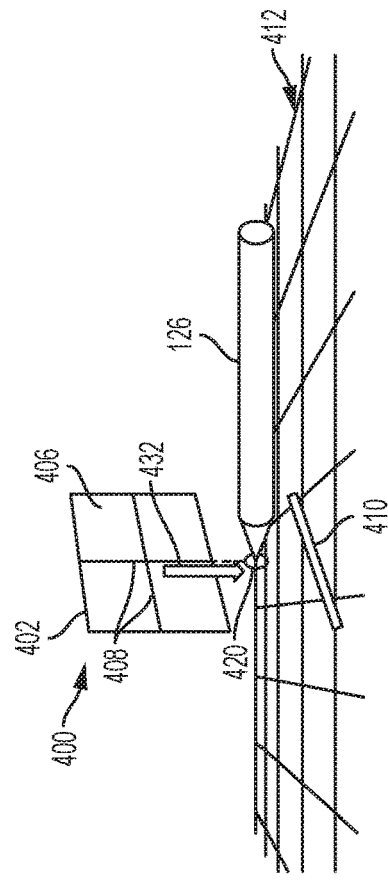

As shown in FIG. 4D, the user may draw (represented by arrow 442) a second surface 440 of the 3D box using the digital pen 126. The second surface 440 may have a default position and orientation based on the position and orientation of the adjacent first surface 406 and/or any other adjacent surfaces. As shown in FIG. 4D, the drop shadow 410, and the profile lines on the new surface 440, indicate that the surface is initially created coplanar with the first surface 406. The user can then use the orientation method described above to change the orientation of the new surface 440 to form the second surface of the desired cube. The user may then draw additional surfaces of the 3D box until the 3D drawing is complete.

Figure 5A:
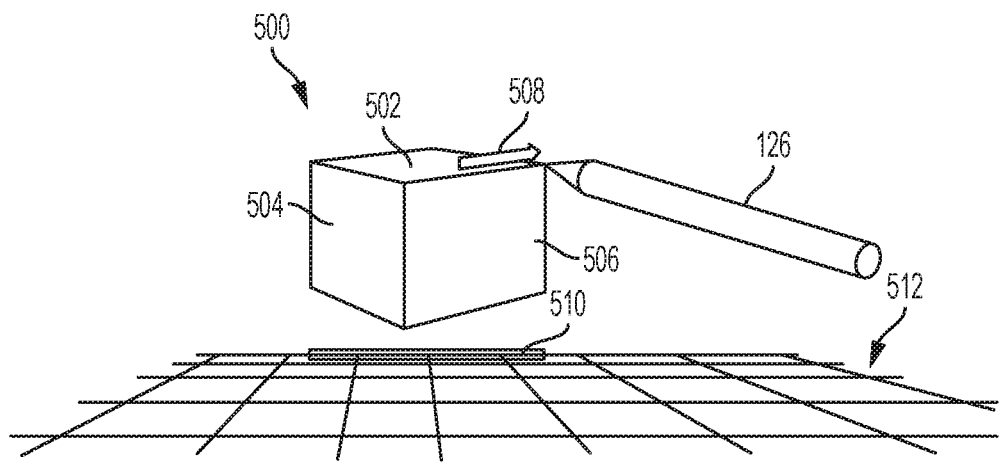
FIGS. 5A-5C are diagrams illustrating the use of pen tilt to facilitate the drawing of a 3D box according to yet another example.
Figure 5B:
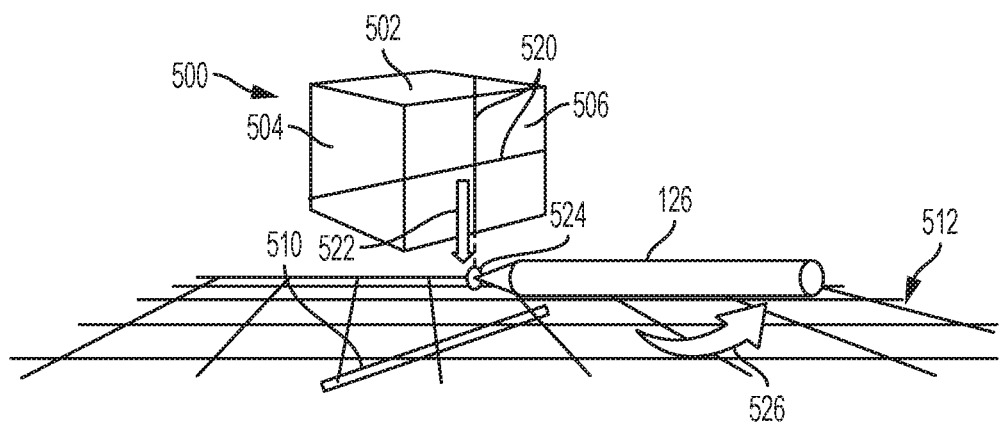
Figure 5C:
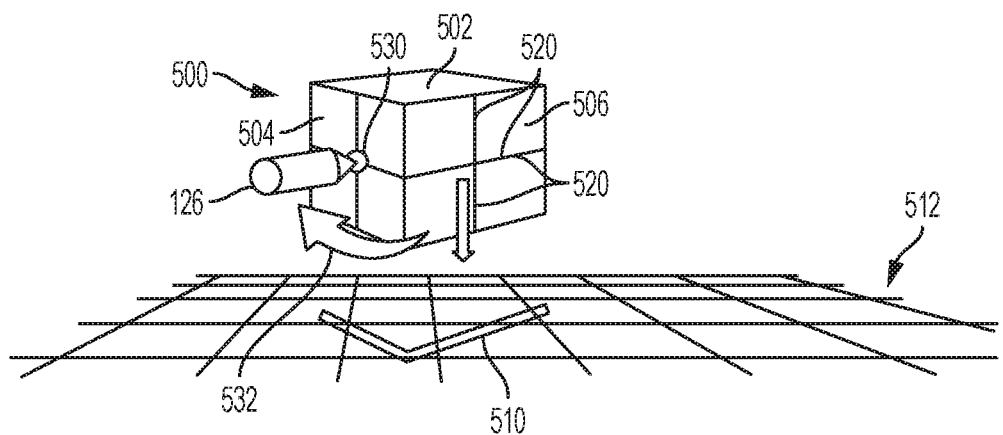

FIGS. 5A-5C are diagrams illustrating the use of pen tilt to facilitate the drawing of a 3D box according to yet another example. As shown in FIG. 5A, a 3D workspace 500 may be generated by 3D CAD application 108 (FIG. 1) and displayed on display 124. The 3D workspace 500 includes a grid 512 defining a horizontal plane or ground plane, and an input plane for entering drawing information. The user may draw (represented by arrow 508) multiple surfaces 502, 504, and 506 of the 3D box using the digital pen 126. A drop shadow 510 is displayed on the grid 512 in a manner corresponding to the position and orientation of the input plane to indicate depth.

As shown in FIG. 5B, profile curves 520 are displayed, and the 3D workspace 500 includes a user interface element 524, which allows a user to manipulate the position and orientation of the surfaces, starting with a first surface 506, using digital pen 126. Specifically, a user may touch the user interface element 524 with the tip of the digital pen 126 and drag the surface 506, as represented by arrow 522, to bring the shape forwards in the 3D workspace, and may also change the tilt angle of the digital pen 126, as represented by arrow 526, to cause a corresponding change in the orientation of the surface 506. In some examples, the orientation of the surface 506 is changed to be perpendicular to a longitudinal dimension of the digital pen 126. Adjacent surfaces 502 and 504 follow the movement of surface 506.

As shown in FIG. 5C, the 3D workspace 500 includes a user interface element 530 associated with the second surface 504, which allows a user to manipulate the position and orientation of that surface using digital pen 126. Specifically, a user may touch the user interface element 530 with the tip of the digital pen 126 and change the tilt angle of the digital pen 126, as represented by arrow 532, to cause a corresponding change in the orientation of the surface 504. In some examples, the orientation of the surface 504 is changed to be perpendicular to a longitudinal dimension of the digital pen 126. Note that the perspective set-up and surface orientation uniquely define surface edges in 3D. This can be used to infer the depth of the right edge of the surface 504, and a default orientation for the surface 502.

Figure 6:
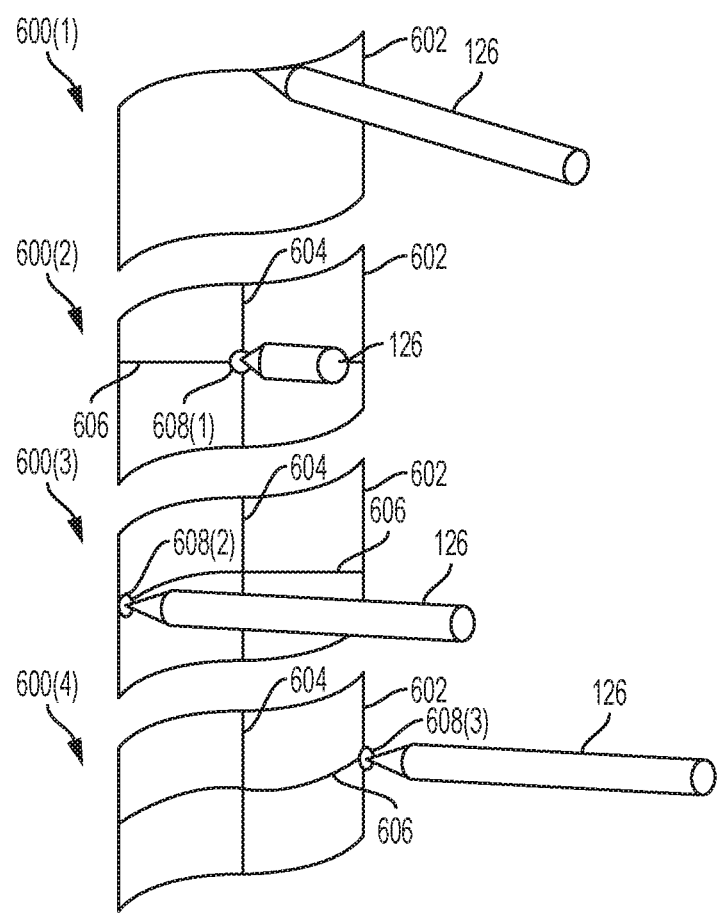
FIG. 6 is a diagram illustrating the use of pen tilt to facilitate the generation of a curved 3D surface according to one example.

FIG. 6 is a diagram illustrating the use of pen tilt to facilitate the generation of a curved 3D surface according to one example. At 600(1) in FIG. 6, a 2D sketch 602 is shown. The 2D sketch 602 may be created, for example, using 2D sketching application 106 (FIG. 1) and digital pen 126, and may be displayed on display 124. At 600(2), profile curves 604 and 606 have been added to the sketch 602. The profile curves 604 and 606(1) may be automatically generated by the 2D sketching application 106, and indicate an initial default planar surface structure. The user may then define various surface normal samples within the region 602 based on the tilt angle of the digital pen 126. As shown at 600(2), a first surface normal sample 608(1) is taken at the intersection of the profile curves 604 and 606 based on the tilt angle of the digital pen 126 when the sample is taken.

At 600(3) in FIG. 6, a second surface normal sample 608(2) is taken at the left edge of the region 602 based on the tilt angle of the digital pen 126 when the sample is taken. The profile curve 606 is then updated based on the additional sample 608(2) (i.e., a slight curve is added to the profile curve 606 between the samples 608(1) and 608(2)). At 600(4) in FIG. 6, a third surface normal sample 608(3) is taken at the right edge of the region 602 based on the tilt angle of the digital pen 126 when the sample is taken. The profile curve 606 is then updated based on the additional sample 608(3) (i.e., a slight curve is added to the profile curve 606 between the samples 608(1) and 608(3)). In some examples, surface curvature is interpolated (e.g., using spline interpolation) between surface normal samples. The surface curvature can be defined one dimension at a time to make the input task easier.

Figure 7:
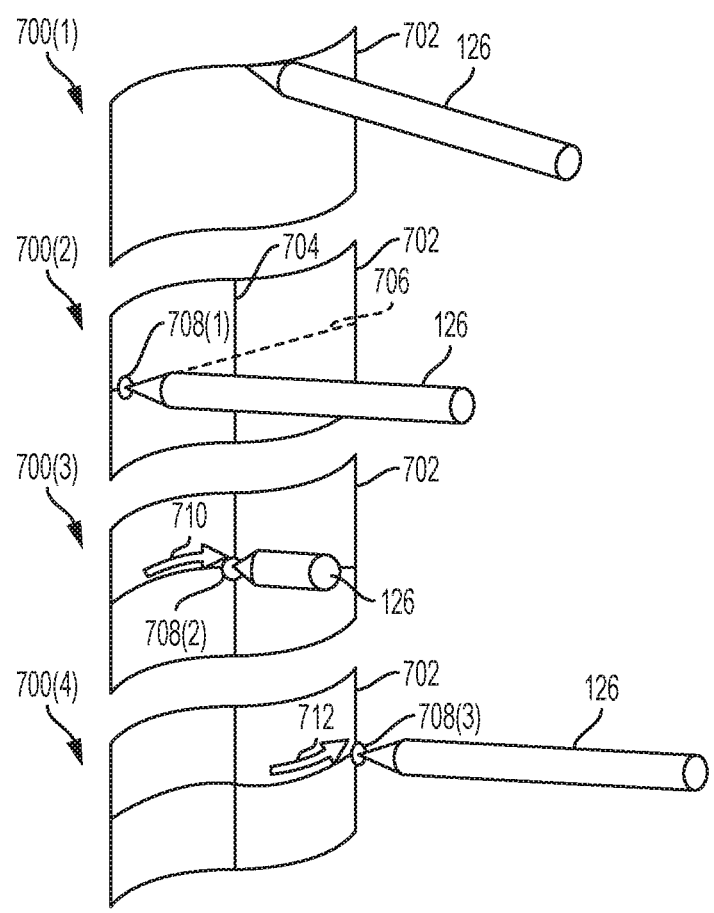
FIG. 7 is a diagram illustrating the use of pen tilt to facilitate the generation of a curved 3D surface according to another example.

FIG. 7 is a diagram illustrating the use of pen tilt to facilitate the generation of a curved 3D surface according to another example. At 700(1) in FIG. 7, a 2D sketch 702 is shown. The 2D sketch 702 may be created, for example, using 2D sketching application 106 (FIG. 1) and digital pen 126, and may be displayed on display 124. At 700(2), a first profile curve 704 has been drawn by the user, and the user is beginning to draw profile curve 706, starting at point 708(1) near a left edge of the sketch 702 and moving toward the right. The tilt angle of the digital pen 126 is continually detected while the user is drawing the profile curves 704 and 706 to provide continuous surface normal information along the curves 704 and 706. The curvature of the profile curves 704 and 706 is automatically updated and displayed based on the detected tilt angles. The dotted lines of the profile curve 706 represent an extension of the profile curve that is automatically estimated and displayed given the current tilt angle of the digital pen 126.

At 700(3) in FIG. 7, the profile curve 706 has been drawn from left to right (as indicated by arrow 710) from the starting point 708(1) to a second point 708(2). At 700(4) in FIG. 7, the profile curve 706 is completed by drawing from left to right (as indicated by arrow 712) from the second point 708(2) to a third point 708(3) near a right edge of the sketch 702. The curvature of the profile curve 706 is continually updated based on the detected tilt angle of the digital pen 126 as the profile curve 706 is being drawn. The surface curvature can be defined one dimension at a time to make the input task easier. The profile curves 704 and 706 may be modified after being drawn by providing additional surface normal samples using the tilt angle of the digital pen 126.

Figure 8:
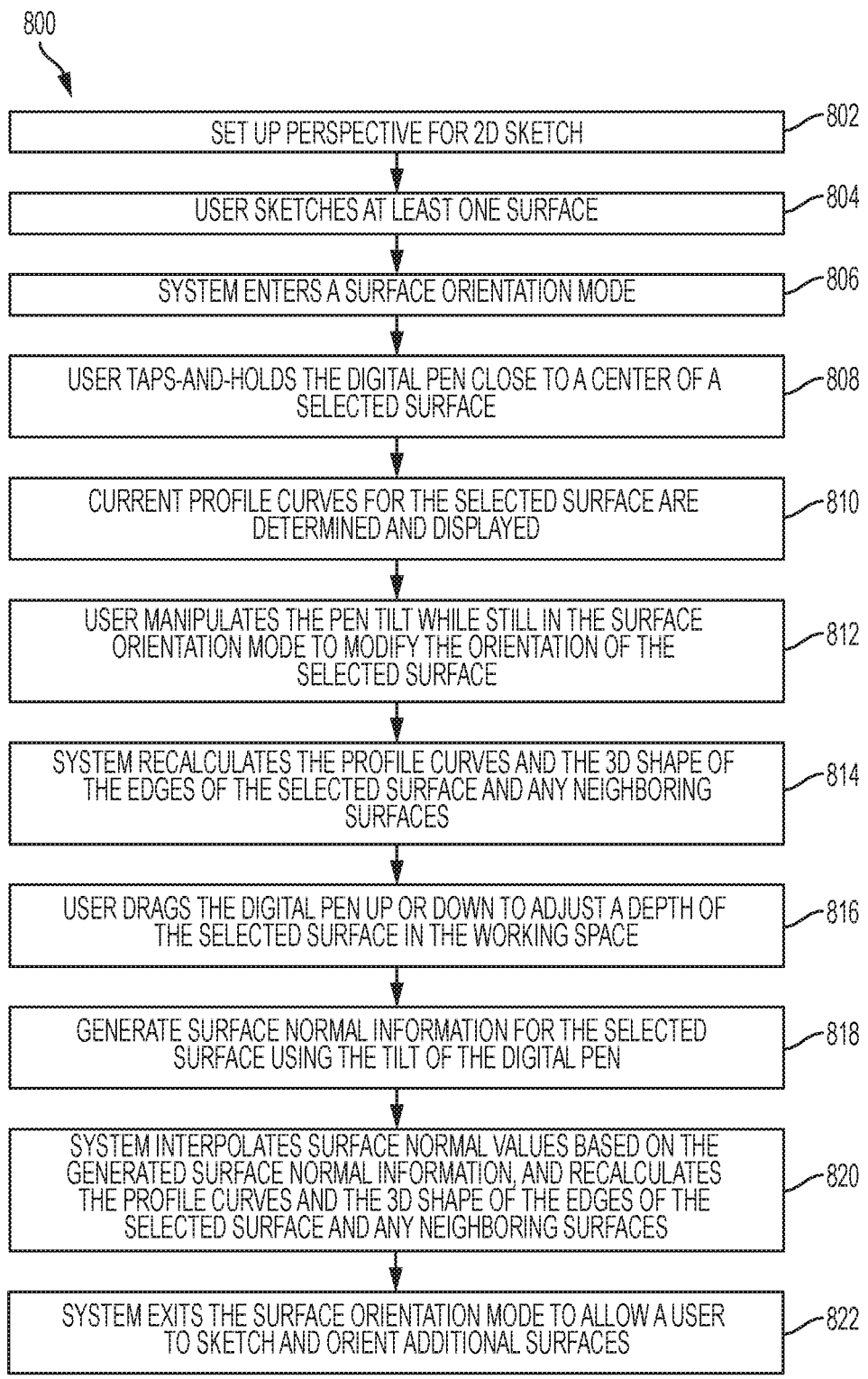
FIG. 8 is a flow diagram of a method for generating a 3D image using the tilt of a digital pen according to one example.

FIG. 8 is a flow diagram of a method 800 for generating a 3D image using the tilt of a digital pen according to one example. In some examples, system 100 (FIG. 1) is adapted to perform method 800. At 802 in method 800, a perspective layout to be used for a 2D sketch is setup. The perspective setup may be made in an application (e.g., 2D sketching application 106) using a perspective grid, or may be set by a user (before or after the sketch, but before orienting surfaces). At 804, a user sketches at least one surface. The sketching of the at least one surface at 804 may occur before or after the 2D perspective sketch setup at 802.

At 806, the system 100 enters a surface orientation mode. At 808, a user taps-and-holds the digital pen close to a center of a selected surface, which causes the system to flood-fill the selected surface to indicate the selection. In some examples, the flood-fill operation is capable of closing small gaps. At 810, current profile curves for the selected surface are determined and displayed on the selected surface, and intersect at the location of the digital pen close to the center of the selected surface. As will be described in further detail below with reference to FIG. 9, the profile curves may be, for example, generated based on an intersection of the selected surface with two orthogonal planes that intersect along a current surface normal, with the first of those planes being vertical.

At 812, a user manipulates the pen tilt while still in the surface orientation mode to modify the orientation of the selected surface. At 814, the system 100 recalculates the profile curves and the 3D shape of the edges of the selected surface, and for any neighboring surfaces. At 816, a user drags the digital pen up or down to adjust a depth of the selected surface in the working space. In some examples, by default, adjacent surfaces follow the selected surface. A surface or multiple surfaces may be detached using, for example, a horizontal "jiggle" gesture, and surfaces may be reattached along an edge using, for example, an edge-crossing join gesture.

At 818, surface normal information for the selected surface is generated using the tilt of the digital pen. A user may place the digital pen within the selected surface, and manipulate the tilt angle of the digital pen to modify the local orientation of the selected surface. The user may drag the digital pen within the selected region and adjust the tilt angle of the digital pen during the movement. At 820, the system 100 interpolates surface normal values based on the surface normal information generated at 818, and recalculates the profile curves and the 3D shape of the edges of the selected surface, and for any neighboring surfaces. At 822, the system 100 exits the surface orientation mode to allow a user to sketch and orient additional surfaces.

Figure 9:
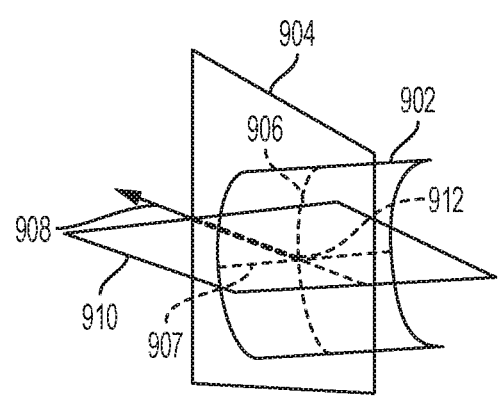
FIG. 9 is a diagram illustrating the automatic generation of profile curves for a surface according to one example.

FIG. 9 is a diagram illustrating the automatic generation of profile curves 906 and 907 for a surface 902 according to one example. A user taps-and-holds the digital pen 126 close to a center 912 of the surface 902, which causes current profile curves 906 and 907 for the surface 902 to be determined and displayed on the surface 902. The profile curves 906 and 907 intersect at the location of the digital pen close to the center 912 of the surface 902. FIG. 9 also shows a vertical plane 904 and a plane 910 that is orthogonal to the vertical plane 904. The profile curves 906 and 907 are generated based on an intersection of the surface 902 with the two orthogonal planes 904 and 910 along a current surface normal (represented by normal vector 908).

One example is directed to a method of generating a three-dimensional (3D) image. The method includes displaying a two-dimensional (2D) image of at least a portion of a 3D object on a display surface. The method includes detecting a tilt angle of a digital pen while the digital pen is used to contact at least one location on a first surface of the 2D image on the display surface, wherein the detected tilt angle represents a surface property of the first surface at the at least one location. The method includes generating a 3D image of the object based on the detected tilt angle.

The detected tilt angle at the at least one location may define a surface normal. The detecting of the tilt angle may further include continually detecting the tilt angle of the digital pen while the digital pen is used to contact and draw across the first surface of the 2D image on the display surface. The detecting of the tilt angle may further include detecting multiple samples of the tilt angle of the digital pen while the digital pen is used to contact multiple locations on the first surface. The method may further include automatically generating profile curves for the first surface. The profile curves may be automatically generated based on an intersection of the first surface with two orthogonal planes. The method may further include interpolating surface curvature of the first surface between samples of the detected tilt angle. The method may further include entering a surface orientation mode; detecting a tilt angle of the digital pen during the surface orientation mode; and modifying an orientation of the first surface based on the detected tilt angle of the digital pen during the surface orientation mode. The method may further include automatically recalculating profile curves for the first surface based on the modified orientation.

Another example is directed to a system that includes at least one processor to: generate a display of a two-dimensional (2D) image of at least a portion of a 3D object on a display surface; detect a tilt angle of a digital pen while the digital pen is used to contact a first surface of the 2D image on the display surface, wherein the detected tilt angle represents a surface normal of the first surface at a location of the contact; and generate a 3D image of the object based on the detected tilt angle. The at least one processor may continually detect the tilt angle of the digital pen while the digital pen is used to contact and draw across the first surface of the 2D image on the display surface. The at least one processor may interpolate surface curvature of the first surface between samples of the tilt angle. The at least one processor may detect a tilt angle of the digital pen during a surface orientation mode, and modify an orientation of the first surface based on the detected tilt angle of the digital pen during the surface orientation mode.

Yet another example is directed to a non-transitory computer-readable storage medium storing instructions that, when executed by at least one processor, cause the at least one processor to: generate a display of a two-dimensional (2D) image of at least a portion of a 3D object on a display surface; generate surface normal information for a first surface of the 2D image based on a tilt angle of a digital pen that is used to contact the first surface; and generate a 3D image of the object based on the surface normal information. The non-transitory computer-readable storage medium may further store instructions that, when executed by the least one processor, cause the at least one processor to modify an orientation of the first surface based on a detected tilt angle of the digital pen during a surface orientation mode.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method of generating a three-dimensional (3D) image, comprising:
   displaying a two-dimensional (2D) image of at least a portion of a 3D object on a display surface;
   detecting a tilt angle of a digital pen while the digital pen is used to contact at least one location on a first surface of the 3D object in the 2D image on the display surface, wherein the detected tilt angle represents a surface property of the first surface of the 3D object at the at least one location; and generating a 3D image of the 3D object based on the detected tilt angle, wherein a shape of the first surface of the 3D object in the generated 3D image is based on the surface property represented by the detected tilt angle.

2. The method of claim 1, wherein the detected tilt angle at the at least one location defines a surface normal of the first surface at the at least one location.

3. The method of claim 1, wherein the detecting of the tilt angle further comprises:

continually detecting the tilt angle of the digital pen while the digital pen is used to contact and draw across the first surface of the 2D image on the display surface.

4. The method of claim 1, wherein the detecting of the tilt angle further comprises:

detecting multiple samples of the tilt angle of the digital pen while the digital pen is used to contact multiple locations on the first surface.

5. The method of claim 1, and further comprising:

automatically generating profile curves for the first surface.

6. The method of claim 5, wherein the profile curves are automatically generated based on an intersection of the first surface with two orthogonal planes.

7. The method of claim 1, and further comprising:

interpolating surface curvature of the first surface between samples of the detected tilt angle.

8. The method of claim 1, and further comprising:

entering a surface orientation mode;

detecting a tilt angle of the digital pen during the surface orientation mode; and modifying an orientation of the first surface based on the detected tilt angle of the digital pen during the surface orientation mode.

9. The method of claim 8, and further comprising:

automatically recalculating profile curves for the first surface based on the modified orientation.

10. A system comprising:

at least one processor to:

generate a display of a two-dimensional (2D) image of at least a portion of a three-dimensional (3D) object on a display surface;

detect a tilt angle of a digital pen while the digital pen is used to contact a first surface of the 3D object in the 2D image on the display surface, wherein the detected tilt angle represents a surface normal of the first surface of the 3D object at a location of the contact; and generate a 3D image of the object based on the detected tilt angle, wherein a shape of the first surface of the 3D object in the generated 3D image is based on the surface normal represented by the detected tilt angle.

11. The system of claim 10, wherein the at least one processor is to continually detect the tilt angle of the digital pen while the digital pen is used to contact and draw across the first surface of the 2D image on the display surface.

12. The system of claim 10, wherein the at least one processor is to interpolate surface curvature of the first surface between samples of the tilt angle.

13. The system of claim 10, wherein the at least one processor is to detect a tilt angle of the digital pen during a surface orientation mode, and modify an orientation of the first surface based on the detected tilt angle of the digital pen during the surface orientation mode.

14. A non-transitory computer-readable storage medium storing instructions that, when executed by at least one processor, cause the at least one processor to:

generate a display of a two-dimensional (2D) image of at least a portion of a three-dimensional (3D) object on a display surface;

generate surface normal information for a first surface of the 3D object in the 2D image based on a tilt angle of a digital pen that is used to contact the first surface; and generate a 3D image of the 3D object, wherein a shape of the first surface of the 3D object in the generated 3D image is based on the surface normal information.

15. The non-transitory computer-readable storage medium of claim 14, and further storing instructions that, when executed by the least one processor, cause the at least one processor to:

modify an orientation of the first surface based on a detected tilt angle of the digital pen during a surface orientation mode.

16. A method of generating a three-dimensional (3D) image, comprising:

displaying a two-dimensional (2D) image of at least a portion of a 3D object on a display surface;

detecting a tilt angle of a digital pen while the digital pen is used to contact at least one location on a first surface of the 2D image on the display surface, wherein the detected tilt angle represents a surface property of the first surface at the at least one location;

generating a 3D image of the object based on the detected tilt angle;

entering a surface orientation mode;

detecting a tilt angle of the digital pen during the surface orientation mode;

modifying an orientation of the first surface based on the detected tilt angle of the digital pen during the surface orientation mode; and automatically recalculating profile curves for the first surface based on the modified orientation.

\* \* \* \* \*